United States Patent [19]

Sandow

[11] 3,834,477

[45] Sept. 10, 1974

[54] SNOWMOBILE CHAIN TENSIONING DEVICE

[75] Inventor: Louis W. Sandow, Menomonee Falls, Wis.

[73] Assignee: Outboard Marine Corporation, Waukegan, Ill.

[22] Filed: May 4, 1973

[21] Appl. No.: 357,392

[52] U.S. Cl. ............ 180/9.64, 180/9.5, 74/242.11 S
[51] Int. Cl. ...................... B62d 55/12, F16h 7/08
[58] Field of Search ............. 74/242.11 S, 242.11 R, 74/242.11 B, 242.11 C; 180/5 R, 9.64; 305/24

[56] References Cited
UNITED STATES PATENTS

| | | | |
|---|---|---|---|
| 2,875,842 | 3/1959 | Morrell | 74/242.11 S |
| 3,439,763 | 4/1969 | Pederson | 74/242.11 S |
| 3,580,094 | 5/1971 | Kraus | 74/242.11 C |
| 3,673,884 | 7/1972 | Southiere | 74/242.11 S |
| 3,711,164 | 1/1973 | Chaumont | 305/24 |

FOREIGN PATENTS OR APPLICATIONS 1,191,860  4/1959  France .......................... 74/242.11 R Primary Examiner—Robert S. Ward, Jr.
Assistant Examiner—Reinhard J. Eisenzopf
Attorney, Agent, or Firm—Michael, Best & Friedrich

[57] ABSTRACT

Disclosed herein is a snowmobile including first and second idler members respectively located exteriorly of the opposite runs of a flexible endless member trained about driving and driven members supported by a chassis at a fixed distance from each other, means co-axially mounting the idler members for pivotal movement into engagement with the outer surface of the flexible endless member, and a unitary helical spring biasing the idler members in opposite rotative directions toward each other so as to engage the idler members with the outer surface of the flexible endless member and thereby to tension the flexible endless member.

1 Claim, 3 Drawing Figures

PATENTED SEP 10 1974 3,834,477

SNOWMOBILE CHAIN TENSIONING DEVICE

BACKGROUND OF INVENTION

The invention relates generally to snowmobiles. More particularly, the invention relates to arrangements for removing slack from the drive belt or sprocket chain which conventionally transmits power from the snowmobile engine to the traction belt or track.

One example of a prior arrangement for tensioning such a drive belt or sprocket chain is disclosed in the U.S. Southiere Pat. No. 3,673,884, issued July 4, 1972.

SUMMARY OF THE INVENTION

The invention provides a drive belt or sprocket chain tensioning arrangement for the power train of a snowmobile having driving and driven sprockets or pulleys located at a fixed center distance from each other, and an endless flexible member, such as a drive belt or sprocket chain, trained around the sprockets or pulleys.

Still more particularly, the invention provides a tensioning arrangement including two rotary idler members or wheels which are mounted for pivotal translatory movement into positions of engagement with the outside surface of the endless member and about an axis located inside the path of the endless belt. Also in accordance with the invention, biasing means are provided, preferably in the form of a unitary helical coil spring which biases the idler members for rotation about their common axis relative to each other and to the snowmobile chassis and into positions for slack removing engagement with the outside surface of the endless member.

In the preferred construction, the idlers are respectively mounted on co-axially pivotally mounted levers which include respective ears engaged by respective ends of a helical spring which is also co-axially mounted relative to the levers.

One of the features of the invention is the provision of a new and effective arrangement for tensioning the drive belt or sprocket chain of a snowmobile.

Other features of the invention will become apparent from the following description and claims and accompanying drawings.

THE DRAWINGS

Figure 1:
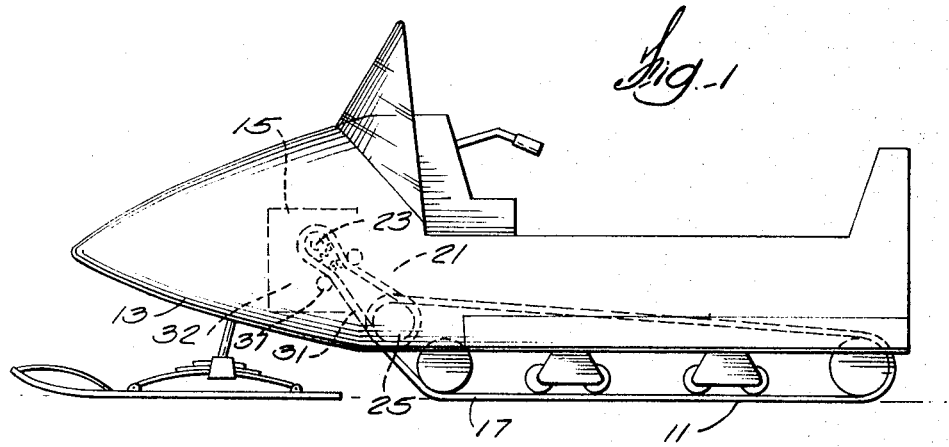
FIG. 1 is a perspective view of a snowmobile embodying various of the features of the invention.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Shown in the drawings is a snowmobile 11 including a chassis 13, an engine 15 supported by the chassis 13, and an endless track or traction belt 17 which is supported by the chassis 13 and driven by the engine 15. More particularly, the track 17 is driven by a power train 21 which is supported by the chassis 13 and which includes a first rotatable member in the form of a chain sprocket or pulley 23 supported by the chassis 13 and rotatably driven by the engine 15, a second rotatable member in the form of a chain sprocket or pulley 25 which is rotatably supported by the chassis 13 at a fixed center distance from the sprocket 23 and drivingly connected, by suitable means, with the track 17, together with an endless flexible member 31 in the form of a sprocket chain or drive belt which is trained around the sprockets or pulleys 23 and 25 for transmission of power therebetween.

The power train 21 further includes idler means 32 operative to maintain desired tension in the endless flexible member 31. In accordance with the invention, such means comprises two idler assemblies 33 and 35, each including an idler member or wheel 37 which is located exteriorly of one run of the endless flexible member and which is rotatably mounted on a lever 39 which, in turn, is pivotally mounted on a stud 41 extending from a housing 43 mounted on the chassis 13. Preferably, the levers 39 are each of identical construction and each includes a short, inturned flange 45 defining an aperture received on the stud 41 and an extending ear or hook 49. The levers 39 are mounted on the stud 41 with the flanges 45 in spaced, facing relation to each other.

Figure 2:
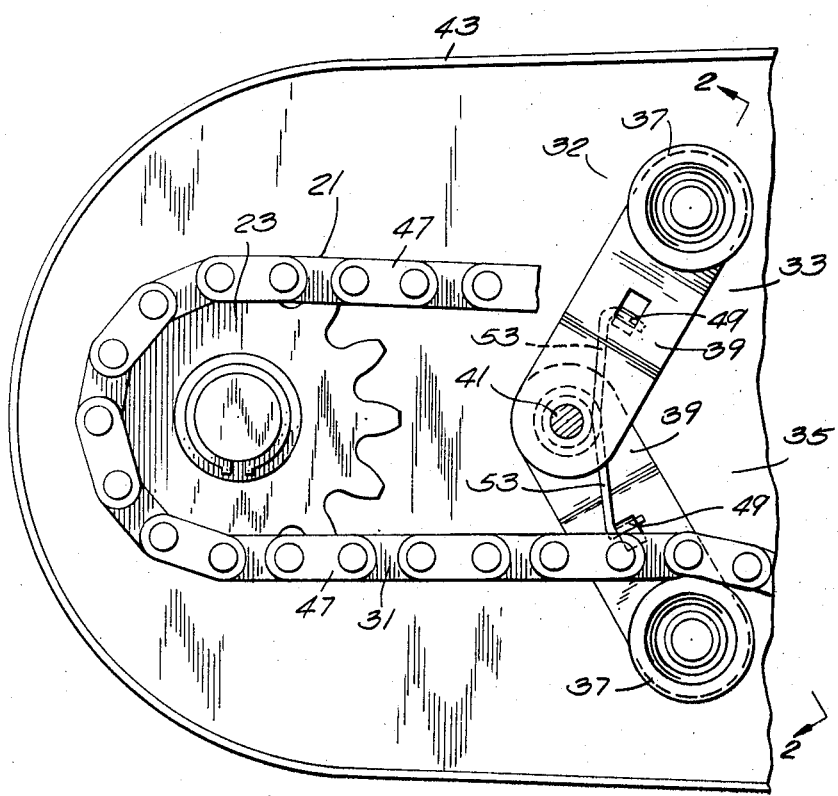
FIG. 2 is an enlarged view of a portion of the snowmobile shown in FIG. 1.
Figure 3:
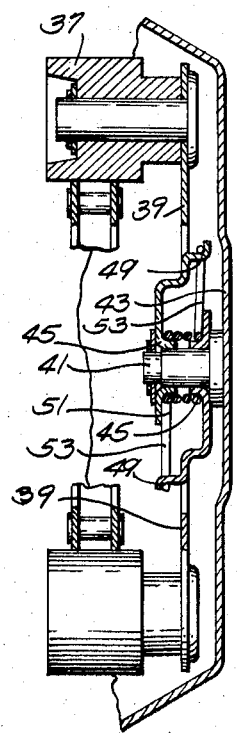
FIG. 3 is a sectional view taken along line 2—2 of FIG. 2.

As shown best in FIG. 2, the stud 41 is located inside the path of the endless member 31 and, accordingly, when the idler assemblies 33 and 35 are mounted on the stud 41, the levers 39 extend outwardly beyond the flexible member 31, and the idler members or wheels 37 are located exteriorly of the endless flexible member 31 and in position for engagement with the outside surface 47 of the endless flexible member 31.

Means are provided for biasing the idler assemblies 33 and 35 for pivotal movement toward positions in which the idler members or wheels 37 are in engagement with the outside surface 47 of the opposed runs of the endless flexible member 31 so as to properly tension the endless flexible member 31. In accordance with the invention, such means preferably comprises a unitary helical spring 51 which is located in encircling relation to the stud 41 outwardly of the flanges 45 and which includes two spaced end portions 53 which are respectively engaged with the respective ears 49 so as to urge the levers 39 for counter rotation toward one another from oppositely extending positions and into engagement with the outside surface 47 of the endless flexible member 31. Thus, the idler assemblies 33 and 35 are co-axially mounted for pivotal movement relative to each other and to the chassis 13 about the stud 41.

In operation, the spring 51 serves to urge the levers 39 for rotation in opposite directions and toward one another from oppositely extending positions, and thereby to urge the idler members or wheels 37 into engagement with the outside surface 47 of the flexible endless member 31. As the run of the flexible endless member 31 extending toward the driving sprocket is tight or taut, the point of engagement between this run and the associated idler member 37 serves to stabilize one of the levers 39, leaving the other of the levers 39 free to rotate about the stud 41 under the influence of the spring 41 relative to the stabilized lever 39 and relative to the chassis 13 and endless flexible member 31 so as to remove slack from the other run of the endless flexible member 31. The arrangement is bi-directional and will operate when either of the chain sprockets or pulleys 23 and 25 is the driver.

Various of the features of the invention are set forth in the following claims.

What is claimed is:

1. A snowmobile comprising a chassis, an engine supported by said chassis, a track movably supported by said chassis, a first rotatable member supported by said chassis and rotatably driven by said engine, a second rotatable member supported by said chassis at a fixed distance from said first rotatable member and drivingly connected to said track, a flexible endless member trained about said first and second rotatable members, a stud extending from said chassis and located interiorly of the path of travel of said endless flexible member, a first lever including an inturned flange defining an aperture pivotally received on said first lever and extending exteriorly of one run of said endless flexible member, a first idler member supported by said first lever exteriorly of said one run of said flexible endless member, and a second lever constructed substantially identically to said first lever and including an inturned flange defining an aperture pivotally received on said stud in facing relation to said inturned flange of said first lever, said second lever extending exteriorly of the other run of said endless flexible member, a second idler member supported by said second lever exteriorly of said other run of said flexible member, and a helical spring located in encircling relation to said stud between said first and second levers and having spaced ends respectively engaged with said first and second levers so as to urge said levers in opposite rotative directions toward each other so as thereby to engage said idler members with the outer surface of said flexible endless member and thereby to tension said flexible endless member.

* * * * *